United States Patent
Fogel et al.

(10) Patent No.: US 8,315,602 B2
(45) Date of Patent: Nov. 20, 2012

(54) COMMUNICATIONS SYSTEM INCLUDING AGGREGATION SERVER FOR DETERMINING UPDATED METADATA OF E-MAIL MESSAGES AND RELATED METHODS

(75) Inventors: Christopher M. Fogel, Waterloo (CA); Robert A. Evers, Waterloo (CA); Ian F. Wilson, Waterloo (CA); Jennifer L. Baumann, Waterloo (CA); Sahaya Sudha Antony, Bellevue, WA (US)

(73) Assignee: Research In Motion Limited, Waterloo, Ontario (CA)

( * ) Notice: Subject to any disclaimer, the term of this patent is extended or adjusted under 35 U.S.C. 154(b) by 181 days.

(21) Appl. No.: 12/830,020

(22) Filed: Jul. 2, 2010

(65) Prior Publication Data
US 2011/0195696 A1   Aug. 11, 2011

Related U.S. Application Data

(60) Provisional application No. 61/301,997, filed on Feb. 5, 2010.

(51) Int. Cl.
*H04L 12/58* (2006.01)
(52) U.S. Cl. .............. 455/412.1; 455/3.01; 709/206; 709/227
(58) Field of Classification Search .......... 455/414.1, 455/412.1, 412.2, 3.01; 709/227, 206
See application file for complete search history.

(56) References Cited

U.S. PATENT DOCUMENTS

| | | | |
|---|---|---|---|
| 7,730,113 B1 * | 6/2010 | Payette et al. ............... | 707/821 |
| 2003/0135565 A1 * | 7/2003 | Estrada ....................... | 709/206 |
| 2004/0153483 A1 | 8/2004 | Cox | |
| 2006/0171420 A1 | 8/2006 | Chu et al. | |
| 2007/0014307 A1 | 1/2007 | Srinivasan et al. ............ | 370/466 |
| 2007/0028004 A1 | 2/2007 | Jeong et al. | |
| 2007/0180125 A1 * | 8/2007 | Knowles et al. .............. | 709/227 |
| 2008/0046534 A1 | 2/2008 | Mousseau et al. | |

(Continued)

FOREIGN PATENT DOCUMENTS

EP   1981234   10/2008

(Continued)

OTHER PUBLICATIONS

"New Alfresco Release Cuts Cost of Records, Email, Mobility, Extranets and CMIS Support", Alfresco Software, http://alfresca.com/media downloaded Jan. 2010, pp. 1-3.

(Continued)

*Primary Examiner* — Vladimir Magloire
(74) *Attorney, Agent, or Firm* — Allen, Dyer, Doppelt, Milbrath & Gilchrist, P.A.

(57) ABSTRACT

A communications system includes a mobile wireless communications device and an e-mail server configured to store pushed e-mail data and metadata associated therewith already pushed to the mobile wireless communications device. An aggregation server is configured to download a first set of metadata of pushed e-mail data at a first time, and generate and store a first set of hash values corresponding to the first set of metadata. The aggregation server is also configured to download a second set of metadata of pushed e-mail data at a second time after the first time, and generate and store a second set of hash values corresponding to the second set of metadata. The aggregation server is further configured to determine an updated set of metadata based upon a comparison of the first and second sets of hash values, and push the updated metadata to the mobile wireless communications device.

20 Claims, 4 Drawing Sheets

U.S. PATENT DOCUMENTS

| | | | |
|---|---|---|---|
| 2009/0030884 A1 | 1/2009 | Pulfer et al. | 707/3 |
| 2009/0031342 A1 | 1/2009 | VerSteeg et al. | |
| 2009/0100009 A1 | 4/2009 | Karp | |
| 2009/0156243 A1 | 6/2009 | Lichtenfeld et al. | 455/466 |
| 2009/0204666 A1 | 8/2009 | Sana et al. | 709/203 |
| 2009/0260060 A1 | 10/2009 | Smith et al. | 726/3 |
| 2009/0313342 A1 | 12/2009 | Thie | 709/206 |

FOREIGN PATENT DOCUMENTS

| | | |
|---|---|---|
| WO | 2006/034384 | 3/2006 |

OTHER PUBLICATIONS

"New Alfresco 3.2 was designed for the Great Recession", Appko Blog, http://blog.apoko.com, Aug. 2009, pp. 1-6.

"Worksite Mobility", Autonomy Product Brief, www.autonomy.com, 2008, pp. 1-4.

"Architecture of the Synchronica Mobile Gateway", www.synchronica.com, downloaded Jan. 2010, pp. 1-9.

"Software maximizes mobile email capacity", ThomasNetNews, www.news.thomasnet.com, Feb. 2009, pp. 1-7.

Shin et al., "Design of MBMS client functions in the mobile", World Academy of Science, Engineering and Technology, Sep. 2006, pp. 19-22.

Google, Google's Gmail Blackberry Client, 2011, pp. 1 of 1.

Autonomy, WorkSite Mobility, Access Client files and documents & file email from anywhere, anytime, 2008, pp. 1-4.

Emoze, Emoze Enterprise Solution, Product Description, 2006, pp. 1-17.

Google, Explore the world's first Android-powered phone, the T-Mobile G1, 2008, pp. 1 of 1.

\* cited by examiner

COMMUNICATIONS SYSTEM INCLUDING AGGREGATION SERVER FOR DETERMINING UPDATED METADATA OF E-MAIL MESSAGES AND RELATED METHODS

RELATED APPLICATION

This application is based upon prior filed copending provisional application Ser. No. 61/301,997 filed Feb. 5, 2010, the entire subject matter of which is incorporated herein by reference in its entirety.

FIELD OF THE DISCLOSURE

This disclosure relates to the field of messaging servers, and, more particularly, to message aggregation servers.

BACKGROUND OF THE DISCLOSURE

Mobile wireless communications devices, such as "smart" cellular phones and personal digital assistants (PDA's) have become pervasive in today's world for a multitude of reasons beyond the convenience of wireless voice communications. Many such mobile wireless communications devices have relatively large screens, full keyboards, and are capable of connecting to the Internet. A popular function provided by some Internet capable mobile wireless communications devices is that of providing a user with wireless access to his e-mail account or accounts. Some mobile wireless communications devices may even, at a user's request, initiate a search of the user's e-mail account for a search term or a set thereof.

There a multitude of ways in which a mobile wireless communications device can provide a user with e-mail access. For example, the device may be used to visit a web page granting e-mail access. Alternatively, the device may poll an e-mail server at regular intervals for new e-mail messages. Unfortunately, both of these methods of e-mail access have drawbacks.

For example, to access an e-mail account via a web page, the entire web page is typically loaded. This represents significantly more information to be transmitted over the network than that contained in the e-mail messages to be read. Further, e-mail access in this fashion does not provide a user with an indication that he has received a new e-mail message unless he proactively uses the mobile wireless communications device to visit the e-mail web page.

Polling an e-mail server at regular intervals for new e-mail messages allows a user to receive a somewhat timely indication that he has received a new e-mail message. However, to conserve bandwidth, the polling interval cannot be too short. Yet, setting the polling interval to a greater period of time may mean that the user will not receive an indication that he has received a new e-mail message in a timely fashion.

A further drawback is that an e-mail message is downloaded once. If metadata about an e-mail message changes (i.e. its status as having been read) on the server, yet that e-mail message has been previously downloaded to the mobile wireless communications device, the metadata of the copy of the e-mail message on the device will not be updated to reflect the change. Thus, a user's e-mail inbox on his phone may not be consistent with his e-mail inbox on the e-mail server when using an e-mail polling method to link a mobile wireless communications device with an e-mail account.

As explained above, a mobile wireless communications device may initiate a search of a user's e-mail account on an e-mail server for a search term or term, and may provide the search results to a user. However, the display of the search results contains similar drawbacks as that of e-mail messages. The mobile wireless communications device may initiate a search, and the server may send the search results thereto. The user may, however, not access those search results until a later point in time, or may repeatedly access those search results over a period of time. If metadata about an e-mail message contained in the search results changes on the server, yet those search results were already communicated to the mobile wireless communications device, the metadata of the e-mail message in the search results will disadvantageously not be updated to reflect the change.

As such, new methods of aggregating e-mail messages and search results from an e-mail server to a mobile wireless communications device are useful.

DETAILED DESCRIPTION OF EXAMPLE EMBODIMENTS

Figure 1:
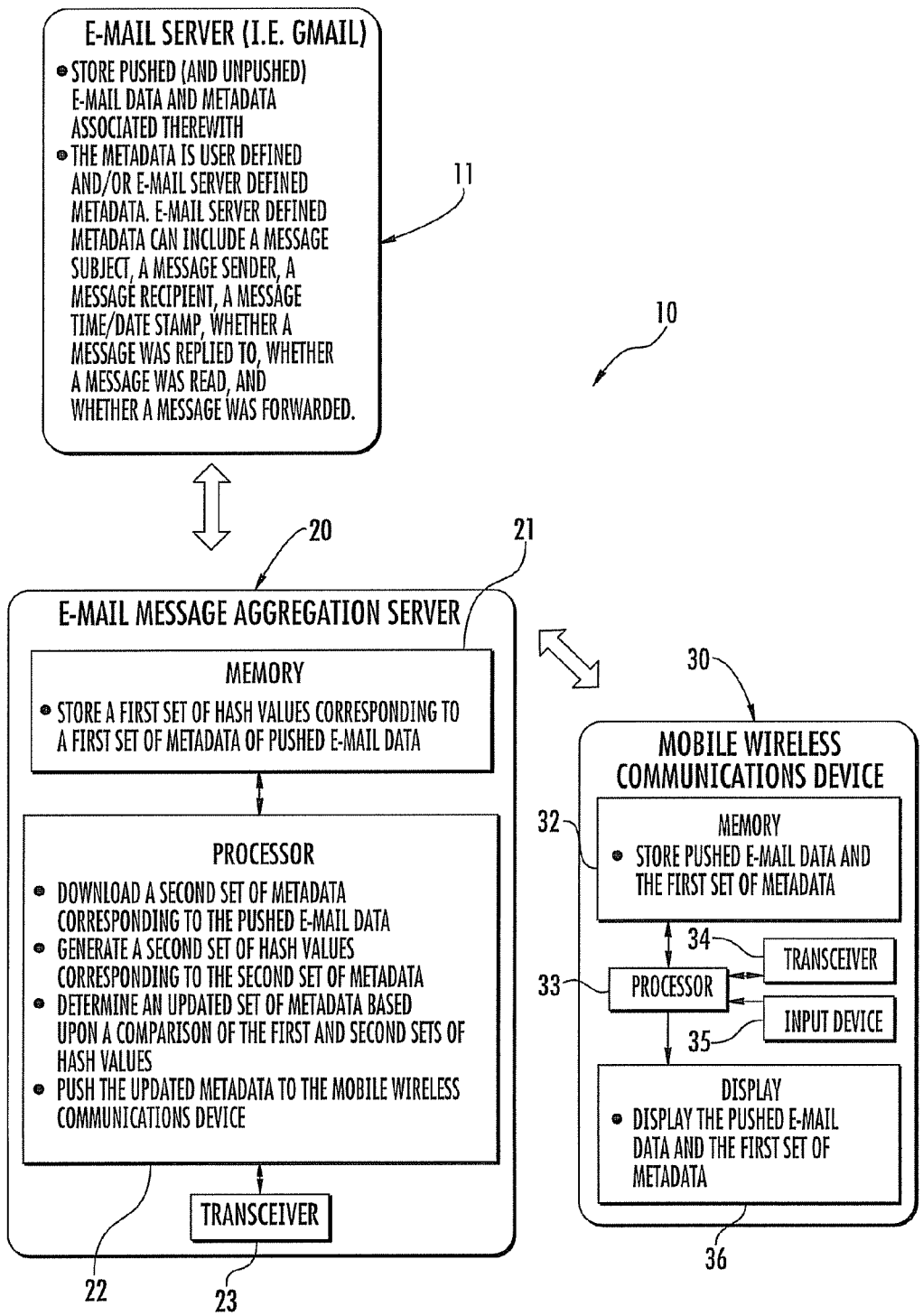
FIG. 1 is a schematic block diagram of a communications system, in accordance with an example embodiment of the present disclosure.

The present disclosure will now be described more fully hereinafter with reference to the accompanying drawings, in which example embodiments are shown. This disclosure may, however, be embodied in many different forms and should not be construed as limited to the example embodiments set forth herein. Rather, these example embodiments are provided so that this disclosure will be thorough and complete, and will fully convey the scope of the disclosure to those skilled in the art.

Generally speaking, a communications system may comprise at least one mobile wireless communications device, an e-mail server, and an aggregation server communicating with the at least one mobile wireless communications device and the e-mail server. The e-mail server may be configured to store at least pushed e-mail data and metadata associated therewith already pushed to respective mobile wireless communications devices.

The aggregation server may comprise a memory and a processor coupled thereto, and may be configured to download a first set of metadata of pushed e-mail data at a first time. The aggregation server may also be configured to generate and store a first set of hash values corresponding to the first set of metadata, and to download a second set of metadata of pushed e-mail data at a second time after the first time. In addition, the aggregation may further be configured to generate and store a second set of hash values corresponding to the second set of metadata, determine an updated set of metadata based upon a comparison of the first and second sets of hash values. Moreover, the aggregation server may push the updated metadata to the at least one mobile wireless communications device.

In some applications, the pushed e-mail data may be pushed e-mail messages and/or pushed e-mail message search results. Also, the aggregation server may be configured to send an updated set of mobile wireless communications device defined metadata to the e-mail server.

The first and second sets of metadata respectively may comprise first and second sets of e-mail server defined metadata. The e-mail server defined metadata may be a message subject, a message sender, a message recipient, a message time/date stamp, whether a message was replied to, whether a message was read, and/or whether a message was forwarded. The first and second sets of metadata may also respectively comprise first and second sets of user defined metadata The e-mail server may be configured to store unpushed e-mail data not yet pushed to respective mobile wireless communications devices, and the aggregation server may also be configured to download the unpushed e-mail data and metadata associated therewith, and to push the unpushed e-mail data to the at least one mobile wireless communications device.

A method aspect is directed to a method of operating an aggregation server to communicate with an e-mail server configured to store at least pushed e-mail data and metadata associated therewith already pushed to respective mobile wireless communications devices. The method may comprise downloading, using a processor, a first set of metadata of pushed e-mail data from an e-mail server configured to store at a first time. The method may further comprise generating and storing, using the processor, a first set of hash values corresponding to the first set of metadata. Additionally, the method may include downloading, using the processor, a second set of metadata of pushed e-mail data at a second time after the first time. Moreover, the method may generate and store, using the processor, a second set of hash values corresponding to the second set of metadata. Furthermore, the method may also include determining, using the processor, an updated set of metadata based upon a comparison of the first and second sets of hash values, and pushing, using the processor and a transceiver, the updated metadata to at least one mobile wireless communications device.

Referring initially to FIG. 1, a communications system 10 is now described. Operation of the communications system 10 will be briefly described as well, although further details will be given later in this disclosure. The communications system 10 includes an e-mail server 11, an aggregation server 20, and a mobile wireless communications device 30. The e-mail server may be a private corporate e-mail server, or a public e-mail server, such as Gmail™ or Yahoo™, and stores both pushed and unpushed e-mail data and metadata associated therewith. The pushed e-mail data is e-mail data that has already been pushed, or sent, to the mobile wireless communications device 30. Conversely, the unpushed e-mail data is that which has not yet been pushed, or sent, to the mobile wireless communications device 30. The e-mail data may comprise e-mail messages, e-mail message search results, or a combination thereof. The metadata may be user defined metadata and/or e-mail server defined metadata. Further details of this metadata will be given below.

The mobile wireless communications device 30 includes a processor 33 and a memory 32, a transceiver 34, an input device 35, and a display 36 cooperating therewith. The input device may be a keyboard, trackball, touch sensitive pad, thumbwheel, or other suitable device.

The transceiver 34 enables wireless communications with the aggregation server 20, such as via the Internet. In particular, the transceiver 34 allows the mobile wireless communications device 30 to access a cellular network, such as a Global System for Mobile Communications (GSM) or Code Division Multiple Access (CDMA) network, that provides data communications with the Internet. In some example embodiments, the transceiver 34 may additionally or alternatively allow communications with a non-cellular wireless network, such as WiFi or WiMAX. The memory 32 stores pushed e-mail messages and metadata associated therewith. The display 36 is for cooperating with the processor 33 to display the pushed e-mail data and the first set of metadata.

The message aggregation server 20 includes a processor 22, and a memory 21 and transceiver 23 cooperating therewith. The transceiver 23 enables the message aggregation server 20 to communicate with both the e-mail server 11 and the mobile wireless communications device 30. The memory 21 stores a first set of hash values corresponding to a first set of metadata of pushed e-mail data.

The processor 22 downloads a second set of metadata corresponding to the pushed e-mail data from the e-mail server 11. The processor 22 also generates a second set of hash values corresponding to the second set of metadata. These hash values may be generated using any suitable hashing function.

The processor 22 also determines an updated set of metadata based upon a comparison of the first and second sets of hash values, and then pushes the updated set of metadata to the mobile wireless communications device 30.

For ease of explanation, only a first time and a second time for metadata downloading, hash value generation, hash value comparison, and updated metadata generation has been discussed, but it should be appreciated that the processor 22 may repeat this process continually, or at given intervals. For example, after pushing the updated set of metadata to the mobile wireless communications device 30, the processor 22 downloads an Nth set of metadata corresponding to the pushed e-mail data from the e-mail server, and generates an Nth set of hash values corresponding to the Nth set of metadata. The processor 22 may then determine an updated set of metadata based upon a comparison of the N-1th set of hash values and the Nth set of hash values, then push the updated set of metadata to the mobile wireless communications device.

Operation of the message aggregation server 21 will now be described in further detail with reference to the flowchart 40 of FIG. 2. After the start (Block 41), at a first time, the message aggregation server 21 polls the e-mail server 11 for unpushed e-mail messages and a first set of metadata corresponding thereto (Block 42). Each unpushed e-mail message has metadata associated therewith, and this metadata includes, but is not limited to, user and e-mail server defined metadata. Examples of user created metadata may include "personal e-mail," "work e-mail," and "family e-mail," but may of course be anything. Examples of e-mail server defined metadata may include read (whether or not the e-mail message has been read by the recipient), sent item (whether or not the e-mail message has been successfully sent), or other labels, such as subject, sender, recipient, a time/date stamp, replied to (whether or not the e-mail message has been replied to), or forwarded (whether or not the e-mail message has been forwarded). It should be appreciated that there may additionally or alternatively be other e-mail server defined labels as well.

In some applications, some of the unpushed e-mail messages are grouped together as conversations, typically comprising an initial e-mail messages, responses thereto, responses to those responses, etc. Unpushed e-mail messages grouped together as conversations each have an additional piece of metadata that identifies which conversation that piece of e-mail belongs to.

The message aggregation server 21 then downloads the unpushed e-mail messages and the first set of metadata from the e-mail server 11 (Block 43). A first set of hash values are generated based upon the first set of metadata, and then stored (Block 44). As will be appreciated by one of skill in the art, any suitable hash function may be used. A hash function is a one-way function, meaning that the input to the hash function cannot typically be determined given only the output. The first set of hash values includes, for each downloaded and unpushed e-mail message, a hash value corresponding to the metadata of that unpushed e-mail message. It is to be understood that the hash values may be based upon a subset of the metadata for each unpushed e-mail message, such as the user and system created labels, in an example embodiment. In other example embodiments, the hash value may be based upon one item of metadata or all of the metadata. By calculating the hash value based upon on a subset of the metadata, a unique value may still be obtained while reducing storage.

The message aggregation server 21 pushes the unpushed e-mail messages together with the first set of metadata to the mobile wireless communications device 30 (Block 45). By "push," it is meant that the message aggregation server 21 sends the unpushed e-mail messages and first set of metadata to the mobile wireless communications device 30 in the absence of a request therefore by the mobile wireless communications device.

At a second time after the first time, the message aggregation server 20 downloads a second set of metadata corresponding to the pushed e-mail messages. (Block 46). This set of metadata may be different than the first set of metadata because some of the user or system created labels of the pushed e-mail messages may have changed, for example.

The message aggregation server 21 then generates a second set of hash values based upon the second set of metadata or a subset thereof, and stores this second set of hash values (Block 47). The first and second sets of hash values are then compared (Block 48) by the aggregation server 21. At Block 49, if there is a difference between the first and second sets of hash values, the aggregation server 21 then proceeds to determine an updated set of metadata (Block 50), and push the updated set of metadata to the mobile wireless communications device (Block 51). If there is no difference between the first and second sets of hash values, an iteration of the processor for metadata updating may end, or optional steps (described below) may be performed.

To determine the updated set of metadata, the message aggregation server 21 therefore compares the first and second sets of hash values for the pushed e-mail messages, and generates an updated set of metadata for those pushed e-mail messages having metadata that was determined to change based upon the hash value comparison. The metadata for the pushed e-mail messages is now synchronized between the e-mail server 11 and the mobile wireless communications device 30. The message aggregation server 20 therefore conserves bandwidth as compared to existing methods of updating metadata, as only metadata that was actually updated as sent, while existing methods simply re-send all metadata, even if unchanged.

Since a hash function is a one-way function, and ideally yields a different output for each and every input, the existence of a difference between the first and second set of metadata can be quickly ascertained by comparing the first and second sets of hash values. This is useful as it saves storage space, as the message aggregation server 21 need not store the first set of metadata, but instead the first set of hash values.

It should be understood that the message aggregation server 20 not only updates the metadata on the mobile wireless communications device 30, but may also update the metadata on the e-mail server 11. Therefore, if a change to the metadata of a pushed e-mail message is made using the mobile wireless communications device 30, a hash value of that metadata is generated and stored by the message aggregation server 20, which then sends that updated metadata to the e-mail server 11. Blocks 52 and 53 illustrate this operation. At Block 52, a user updated set of metadata may be optionally received from the mobile wireless communications device 30, and at Block 53, the user updated set of metadata may be sent to the e-mail server 11. Block 54 indicates the end of operation of a metadata update cycle.

Additional functionality of the message aggregation server 20 is now described with reference to flowchart 60 of FIG. 3. Here, after the start (Block 61), a search request is received by the message aggregation server 20 from the mobile wireless communications device 30 (Block 62). The search request includes a term or terms to search pushed e-mails for, such as "weekend research project." After receiving the search request, the message aggregation server 20 sends the search request to the e-mail server 11 (Block 63), at a first time, and in turn downloads the search results and a first set of metadata corresponding thereto from the e-mail server (Block 64). The search results include pushed e-mail messages containing the desired search term(s), and the first set of metadata is the metadata (as described above) for each e-mail message in the search results.

A first set of hash values based upon the first set of metadata are then generated and stored by the message aggregation server 20 (Block 65), which then pushes the search results and the first set of metadata to the mobile wireless communications device 30 (Block 66). The mobile wireless communications device 30 stores the pushed search results for display.

At a second time after the first time, a second set of metadata corresponding to the search results is downloaded (Block 67). The message aggregation server 20 then generates and stores a second set of hash values based upon the second set of metadata (Block 68), and compares the first and second sets of hash values (Block 69). At Block 70, if there are differences between the first and second sets of hash values, an updated set of metadata is determined (Block 71), and the updated set of metadata is then pushed to the mobile wireless communications device 30 (Block 72). This is useful as it allows the update of the metadata of the e-mail messages within the search results. Therefore, when the search results are viewed, the metadata for the e-mail messages contained therein will be recent. If there are no differences between the first and second sets of hash values, an iteration of the metadata updating process may end, or the following optional steps may be taken.

A user updated set of metadata may be optionally received form the mobile wireless communications device 30 (Block 73), and this user updated set of metadata may be sent to the e-mail server 11 (Block 74). Block 75 indicates the end of an iteration of a search result metadata update.

A non-limiting example of various functional components that can be used in the example mobile wireless communications device 30 is further described in the example below with reference to FIG. 4. New reference numerals are used. The device 100 illustratively includes a housing 120, a keypad 140 and an output device 160. The output device 160 shown may comprise a display, which may comprise a full graphic LCD and may be touch sensitive as an input device. Other types of output devices may alternatively be used. A processing device 180 is contained within the housing 120 and is coupled between the keypad 140 and the display 160. This device 180 is typically a microprocessor chip contained on a circuit board in the housing 120. If the display is a touch-activated display, the keypad 140 may not be necessary. The processing device 180 controls the operation of the display 160, as well as the overall operation of the mobile device 100, in response to actuation of keys on the keypad 140 by the user.

The housing 120 may be elongated vertically, or may take on other sizes and shapes (including clamshell housing structures). The keypad may include a mode selection key, or the device may include other hardware or software for switching between text entry and telephony entry.

Figure 4:
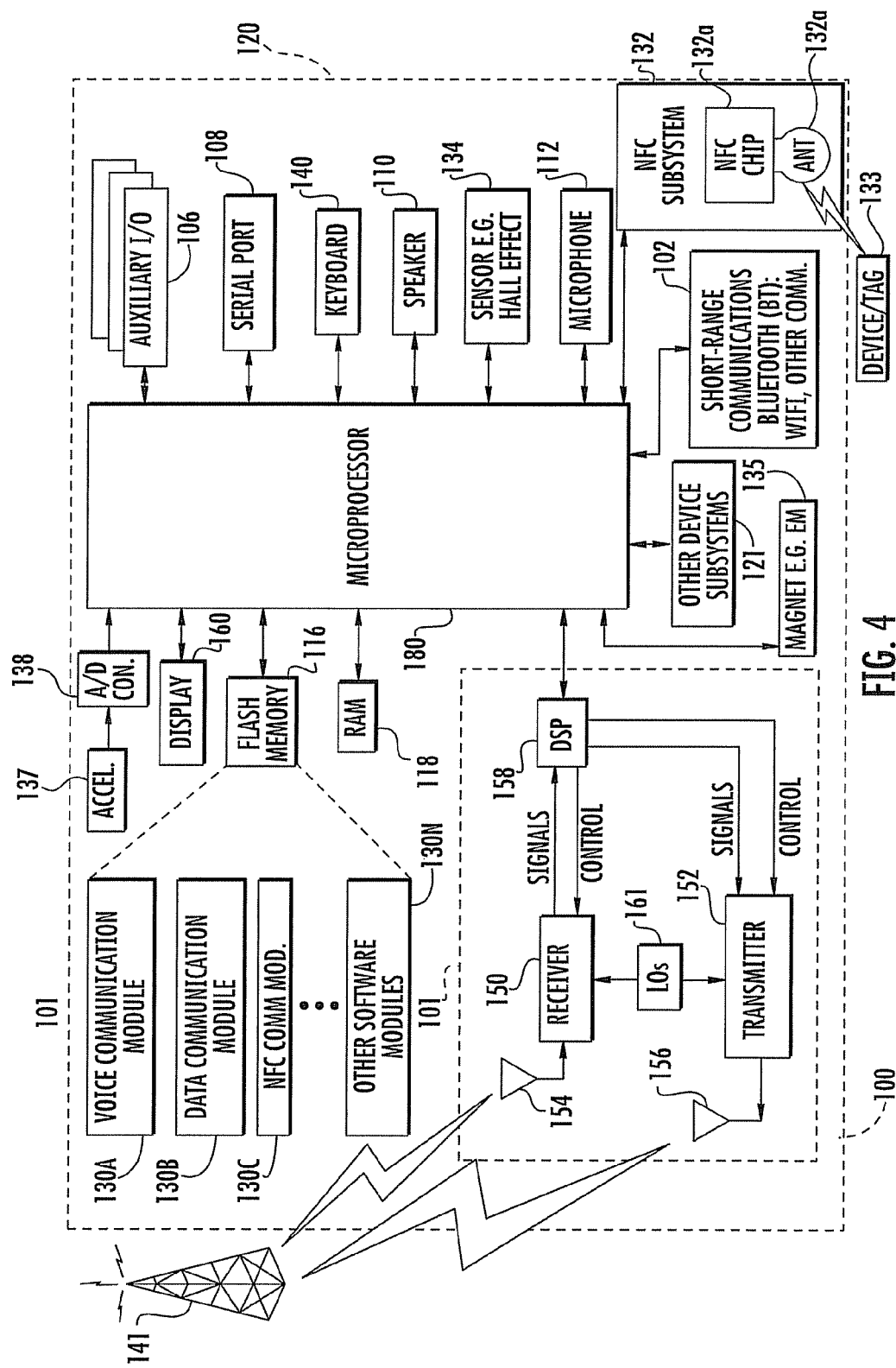
FIG. 4 is a high-level block diagram showing example embodiment additional components that can be used in the wireless communications device shown in FIG. 1.

In addition to the processing device 180, other parts of the mobile device 100 are shown schematically in FIG. 4. These include a communications subsystem 101; a short-range communications subsystem 102; the keypad 140 and the display 160, along with other input/output devices 106, 108, 110 and 112; as well as memory devices 116, 118 and various other device subsystems 121. The mobile device 100 is in this example a two-way RF communications device having voice and data communications capabilities using RF circuitry. In addition, the mobile device 100 has the capability to communicate with other computer systems via the Internet. The short-range communications subsystem 102 includes a Bluetooth™ communications module for establishing a Bluetooth™ wireless connection and other communications modules such as an infrared module or device, WiFi circuit and module, and associated components and circuits as part of RF circuitry.

Operating system software executed by the processing device 180 may be stored in a persistent store, such as the flash memory 116, or may be stored in other types of memory devices, such as a read only memory (ROM) or similar storage element. In addition, system software, specific device applications, or parts thereof, may be temporarily loaded into a volatile store, such as the random access memory (RAM) 118. Communications signals received by the mobile device may also be stored in the RAM 118.

The processing device 180, in addition to its operating system functions, enables execution of software applications 130*a*-130*n* on the device 100. A predetermined set of applications that control basic device operations, such as data and voice communications 130*a* and 130*b*, may be installed on the device 100 during manufacture. A Near Field Communications module 130C is also installed as illustrated.

The NFC communications module 130*c* as a software module cooperates with the microprocessor 180 through the flash memory 116. The microprocessor 180 operates also with the NFC subsystem 132 that includes a NFC chip 132*a* and antenna 132*b* that communicates with another device/tag 133. The NFC communications module 130*c* allows the microprocessor to control the NFC subsystem 132, which includes the NFC chip 132*a* and antenna 132*b* that is tuned typically for 13.56 MHz. The NFC chip 132*a* could be, for example, a PN531 microcontroller-based transmission module from the Phillips Semiconductor Branch of Koninklijke Phillips Electronics N.V. When the NFC chip is a PN531 module, the NFC chip 132*a* could include analog circuitry and a contact list Universal Asynchronous Receiver Transmitter (UART), a core and a set of host interfaces. The analog circuitry could include an output driver, an integrated demodulator, a bit decoder, a mode detector and an RF-level detector. The contact list UART could include elements for data processing, Cyclical Redundancy Checking (CFC), parity generation, framing generation and check bit coding and decoding. The core typically includes an 80C51 microcontroller, 32 Kbyte of ROM and one Kbyte of RAM. A set of host interfaces can interface with the microprocessor and interface according to such known standards as I2C, serial UART, SPI and USB.

There is also illustrated the magnetic sensor 134 that could be formed as a Hall Effect sensor and is connected to the microprocessor 180. It includes the various components that operate as a Hall Effect sensor, including any necessary coils or other circuits. There is also illustrated a magnet 135 that, in one example, is formed as an electromagnet and operates with the microprocessor to allow a different communications pathway using electromagnetic energy that is changed to correspond to changing data. The electromagnet 135 operates, in one example, to form another communications protocol pathway. This electromagnet 135 has different functions, including working as an active or passive device in association with other components of the device 100 as illustrated. For example, when the electromagnet 135 is used in place of an installed magnet (non-electromagnetic) in the devices of FIG. 4, a pulse of energy is delivered to the Hall Effect sensor in the other device. The other device receives the pulse and establishes a Bluetooth™ connection without going through activation of the NFC circuit. A WiFi connection, for example, in the alternative is established if a Bluetooth™ connection is not established. Other software modules 130*n* include software that interoperates with the magnetic sensor 134 and any magnet or electromagnet 135 or other magnetic circuitry that are included within the overall electromagnet 135. Those skilled in the art will appreciate that the magnetic sensor 134 is optional.

An accelerometer 137 and an analog/digital converter 138 are connected to the microprocessor 180 as illustrated and allow another implementation of the NFC automatic tag detection (and automatic peer-to-peer detection). The accelerometer 137 recognizes the tapping of a communications device against a tag or another device, i.e., recognizes the vibrations. Instead of using the Hall Effect sensors and magnets to wake up the NFC circuit, the circuit uses tap recognition, for example, as a vibration sensor and accelerometer in this example. It should be understood that when the device is tapped against another object, for example, an NFC tag, a profile is generated as a matter of certain accelerometer parameters being met or exceeded. If the profile is compared against a known tap profile, it will wake the NFC circuit and initiate communication. In other example embodiments, the accelerometer could be part of a motion sensor system and other motion sensor systems other than an accelerometer could be used such as a cadence sensor or cadence detection system.

As will be appreciated by persons skilled in the art, an accelerometer is a sensor which converts acceleration from motion (e.g., movement of the communications device or a portion thereof due to the strike force) and gravity which are detected by a sensing element into an electrical signal (producing a corresponding change in output) and is available in one, two or three axis configurations. Accelerometers may produce digital or analog output signals depending on the type of accelerometer. Generally, two types of outputs are available depending on whether an analog or digital accelerometer is used: (1) an analog output requiring buffering and analog-to-digital (A/D) conversion; and (2) a digital output which is typically available in an industry standard interface such as an SPI (Serial Peripheral Interface) or I2C (Inter-Integrated Circuit) interface. The example embodiment shown in FIG. 4 illustrates an analog output into the A/D converter 138. The output of an accelerometer is typically measured in terms of the gravitational acceleration constant at the Earth's surface, denoted g, which is approximately 9.81 m/s$^2$ (32.2 ft/s$^2$) as the standard average. The accelerometer may be of almost any type including, but not limited to, a capacitive, piezoelectric, piezoresistive, or gas-based accelerometer. The range of accelerometers varies up to the thousands of g's, however for portable electronic devices "low-g" accelerometers may be used. Example low-g accelerometers which may be used are MEMS digital accelerometers from Analog Devices, Inc. (ADI), Freescale Semiconductor, Inc. (Freescale) and STMicroelectronics N.V. of Geneva, Switzerland.

The operational settings of the accelerometer, in one example, are controlled using control signals sent to the accelerometer via a serial interface. In one illustrated example, the microprocessor determines the motion detection in accordance with the acceleration measured by the accelerometer. Raw acceleration data measured by the accelerometer, in another example, is sent to the microprocessor via a serial interface where motion detection is determined by the operating system or other software module. In other example embodiments, a different digital accelerometer configuration could be used, or a suitable analog accelerometer and control circuit could be used.

In addition, a personal information manager (PIM) application may be installed during manufacture. The PIM is capable of organizing and managing data items, such as email, calendar events, voice mails, appointments, and task items. The PIM application is also capable of sending and receiving data items via a wireless network 141. The PIM data items are seamlessly integrated, synchronized and updated via the wireless network 141 with the device user's corresponding data items stored or associated with a host computer system.

Communication functions, including data and voice communications, are performed through the communications subsystem 101, and possibly through the short-range communications subsystem 120, which are part of RF circuitry contained on a circuit board typically as shown by the outline. The communications subsystem 101 includes a receiver 150, a transmitter 152, and one or more antennae 154 and 156. In addition, the communications subsystem 101 also includes a processing module, such as a digital signal processor (DSP) 158, and local oscillators (LOs) 161 as part of RF circuitry in this example. The specific design and implementation of the communications subsystem 101 is dependent upon the communications network in which the mobile device 100 is intended to operate. For example, the mobile device 100 may include a communications subsystem 101 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be used with the mobile device 100.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically utilizes a subscriber identity module, commonly referred to as a SIM card, in order to operate on a GPRS network.

When required network registration or activation procedures have been completed, the mobile device 100 sends and receives communications signals over the communication network 141. Signals received from the communications network 141 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communications functions, such as demodulation and decoding. In a similar manner, signals to be transmitted to the network 141 are processed (e.g., modulated and encoded) by the DSP 158 and are then provided to the transmitter 152 for digital to analog conversion, frequency up conversion, filtering, amplification and transmission to the communication network 141 (or networks) via the antenna 156.

In addition to processing communications signals, the DSP 158 provides for control of the receiver 150 and the transmitter 152. For example, gains applied to communications signals in the receiver 150 and transmitter 152 may be adaptively controlled through automatic gain control algorithms implemented in the DSP 158.

In a data communications mode, a received signal, such as a text message or web page download, is processed by the communications subsystem 101 and is input to the processing device 180. The received signal is then further processed by the processing device 180 for an output to the display 160, or alternatively to some other auxiliary I/O device 106. A device user may also compose data items, such as e-mail messages, using the keypad 140 and/or some other auxiliary I/O device 106, such as a touchpad, a trackball, a trackpad, a rocker switch, a thumb-wheel, or some other type of input device. The composed data items may then be transmitted over the communications network 141 via the communications subsystem 101.

In a voice communications mode, overall operation of the device is substantially similar to the data communications mode, except that received signals are output to a speaker 110, and signals for transmission are generated by a microphone 112. Alternative voice or audio I/O subsystems, such as a voice message recording subsystem, may also be implemented on the device 100. In addition, the display 160 may also be used in voice communications mode, for example to display the identity of a calling party, the duration of a voice call, or other voice call related information and whether there are NFC communications or a Bluetooth™ connection.

Any short-range communications subsystem enables communication between the mobile device 100 and other proximate systems or devices, which need not necessarily be similar devices. For example, the short-range communications subsystem may include an infrared device and associated circuits and components as described above, or a Bluetooth™ communications module to provide for communication with similarly-enabled systems and devices as well as the NFC communications.

In accordance with various example embodiments, GSM is an example communications system and uses a radio interface that can have an uplink frequency band and downlink frequency band with about 25 MHz bandwidth, typically subdivided into 124 carrier frequency channels, each spaced about 200 KHz apart as non-limiting examples. Time division multiplexing is usually used to allow about 8 speech channels per radio frequency channel, giving 8 radio time slots and 8 burst periods grouped into what is called a TDMA frame. For example, a channel data rate is typically about 270.833 Kbps and a frame duration of about 4.615 milliseconds (MS) in one non-limiting example. The power output usually varies from about 1 to about 2 watts.

Typically, linear predictive coding (LPC) is used to reduce the bit rate and provide parameters for a filter to mimic a vocal track with speech encoded at about 13 Kbps. Four different cell sizes are typically used in a GSM network, including macro, micro, pico and umbrella cells. A base station antenna is typically installed on a master building above the average rooftop level in a macrocell. In a microcell, the antenna height is typically under the average rooftop level and used in urban areas. Microcells typically have a diameter of about a few dozen meters and are used indoors. Umbrella cells usually cover shadowed regions or smaller cells. Typically, the longest distance for the GSM specification covered by an antenna is about 22 miles depending on antenna height, gain and propagation conditions.

GSM systems typically include a base station subsystem, a network and switching subsystem, and a General Packet Radio Service (GPRS) core network. A subscriber identity module (SIM) is usually implemented in the communications device, for example, the well-known SIM card, similar to a smart card containing the subscription information and phone book of a user. The user typically switches handsets or could change operators by changing a SIM. USIM, RUIN or CSIM and other similar technologies can be used in UMTS or CDMA networks.

The GSM signaling protocol has three general layers. Layer 1 is a physical layer using channel structures above the air interface. Layer 2 is the data link layer. Layer 3 is a signaling protocol, which includes three sublayers. These include a Radio Resources Management sublayer to control the setup, maintenance and termination of radio and fixed channels, including handovers. A Mobility Management sublayer manages the location updating and registration procedures and secures the authentication. A Connection Management sublayer handles general call control and manages supplementary services and the short message service. Signaling between different entities such as the Home Location Register (HLR) and Visiting Location Register (VLR) can be accomplished through a Mobile Application Part (MAP) built upon the Transaction Capabilities Application Part (TCAP) of the top layer of the Signaling System No. 7.

A Radio Resources Management (RRM) sublayer typically oversees the radio and fixed link establishment between the mobile station and an MSE.

It is also possible to used Enhanced Data Rates for GSM Evolution (EDGE), as an enhancement to General Packet Radio Service (GPRS) networks. EDGE typically uses 8 Phase Shift Keying (8 PSK) and Gaussian Minimum Shift Keying (GMSK) for different modulation and coding schemes. A three-bit word is usually produced for every changing carrier phase. A rate adaptation algorithm typically adapts the Modulation and Coding Scheme (MCS) according to the quality of the radio channel and the bit rate and robustness of data transmission. Base stations are typically modified for EDGE use.

Figure 2:
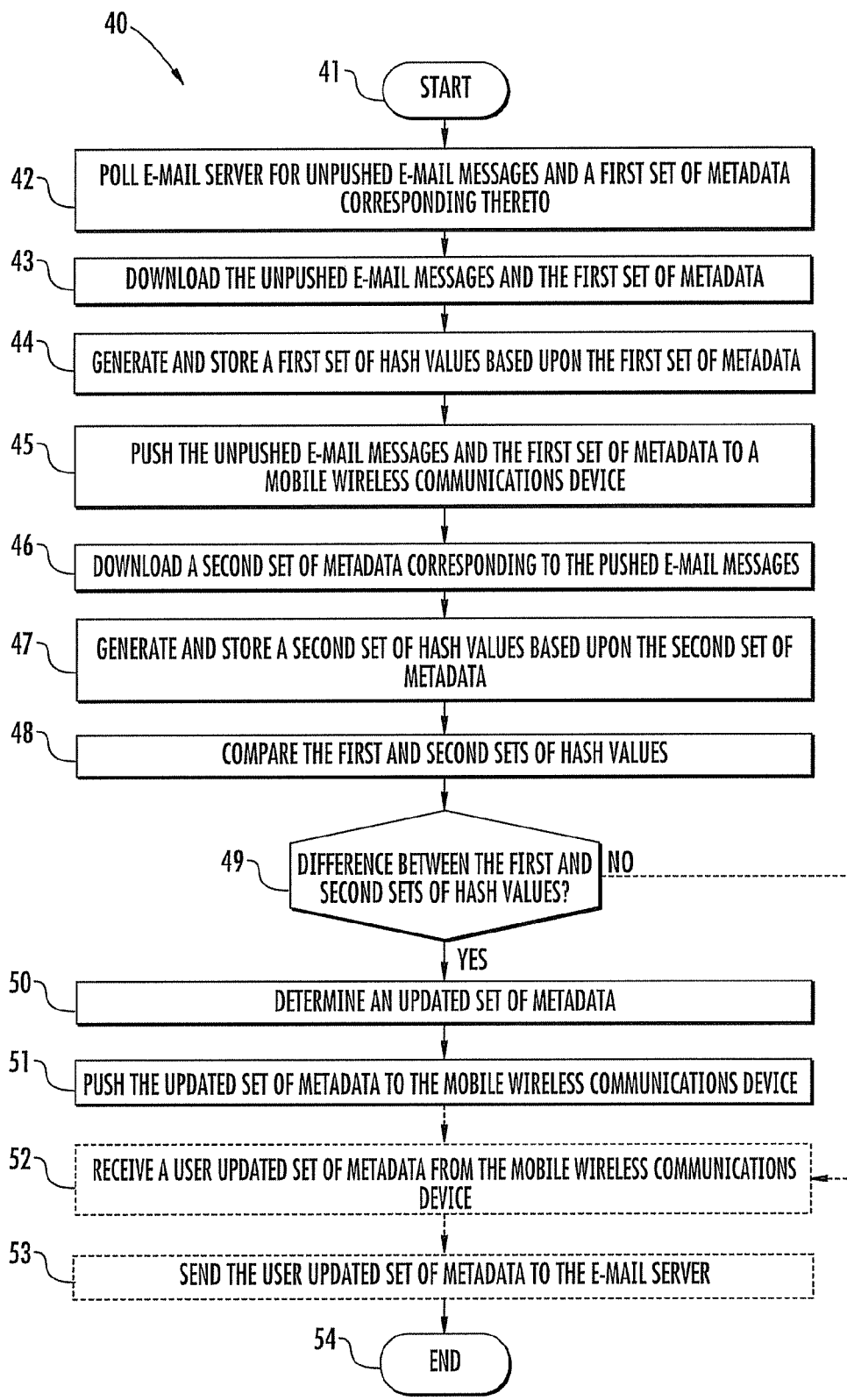
FIG. 2 is a flowchart of operation of the message aggregation server of FIG. 1, in accordance with an example embodiment of the present disclosure.
Figure 3:
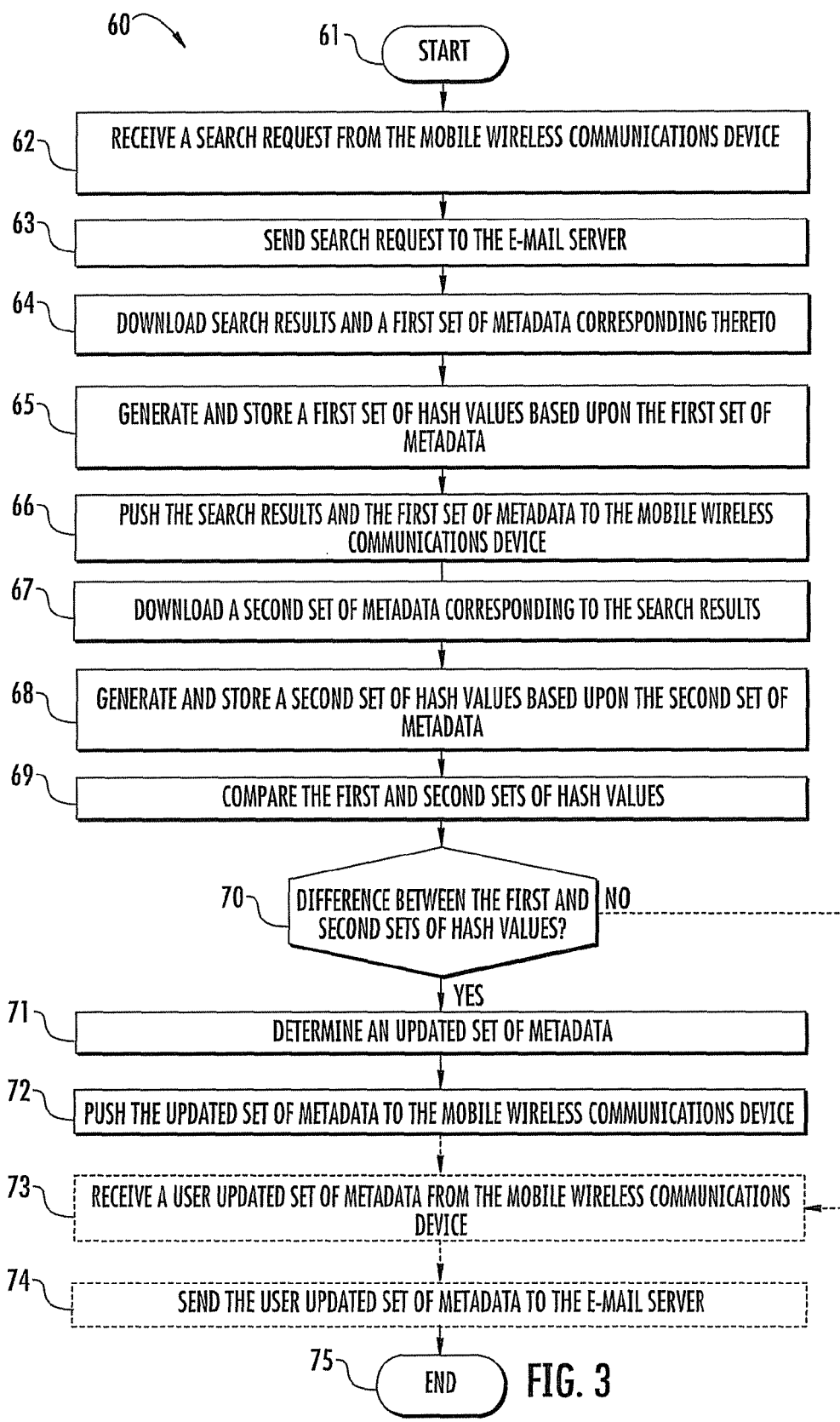
FIG. 3 is a flowchart of further operation of the message aggregation server of FIG. 1, in accordance with an example embodiment of the present disclosure.

FIGS. 2-3 are flowcharts example embodiment methods. Some of the steps illustrated in the flowchart may be performed in an order other than that which is described. Also, it should be appreciated that not all of the steps described in the flowchart are required to be performed, that additional steps may be added, and that some of the illustrated steps may be substituted with other steps.

Many modifications and other embodiments will come to the mind of one skilled in the art having the benefit of the teachings presented in the foregoing descriptions and the associated drawings. Therefore, it is understood that the disclosure is not to be limited to the specific example embodiments disclosed, and that modifications and embodiments are intended to be included within the scope of the appended claims.

That which is claimed is:

1. A communications system comprising:
at least one mobile wireless communications device;
an e-mail server configured to store pushed e-mail data and metadata associated therewith already pushed to respective mobile wireless communications devices; and
an aggregation server comprising a memory and a processor coupled thereto, and configured to
download a first set of metadata of the pushed e-mail data at a first time,
generate and store a first set of hash values corresponding to the first set of metadata;
download a second set of metadata of the pushed e-mail data at a second time after the first time,
generate and store a second set of hash values corresponding to the second set of metadata,
determine an updated set of metadata based upon a comparison of the first and second sets of hash values, and
push the updated set of metadata to the at least one mobile wireless communications device.

2. The communications system of claim 1, wherein said e-mail server is also configured to store unpushed e-mail data not yet pushed to respective mobile wireless communications devices; and wherein said aggregation server is also configured to download the unpushed e-mail data and metadata associated therewith, and push the unpushed e-mail data to the at least one mobile wireless communications device.

3. The communications system of claim 1, wherein the first and second sets of metadata respectively comprise first and second sets of e-mail server defined metadata.

4. The communications system of claim 3, wherein the e-mail server defined metadata comprises at least one of a message subject, a message sender, a message recipient, a message time/date stamp, whether a message was replied to, whether a message was read, and whether a message was forwarded.

5. The communications system of claim 1, wherein the first and second sets of metadata respectively comprise first and second sets of user defined metadata.

6. The communications system of claim 1, wherein said aggregation server is also configured to send an updated set of mobile wireless communications device defined metadata to said e-mail server.

7. The communications system of claim 1, wherein the pushed e-mail data comprises pushed e-mail messages.

8. The communications system of claim 1, wherein the pushed e-mail data comprises pushed e-mail message search results.

9. An aggregation server for communicating with at least one mobile wireless communications device and an e-mail server, the e-mail server being configured to store pushed e-mail data and metadata associated therewith already pushed to respective mobile wireless communications devices, the aggregation server comprising:
a memory;
a processor cooperating with said memory and configured to
download a first set of metadata of the pushed e-mail data at a first time,
generate and store a first set of hash values corresponding to the first set of metadata,
download a second set of metadata of the pushed e-mail data at a second time after the first time, generate and store a second set of hash values corresponding to the second set of metadata, determine an updated set of metadata based upon a comparison of the first and second sets of hash values, and push the updated metadata to the at least one mobile wireless communications device.

10. The aggregation server of claim 9, wherein said e-mail server is also configured to store unpushed e-mail data not yet pushed to respective mobile wireless communications devices; and wherein said aggregation server is also configured to download the unpushed e-mail data and metadata associated therewith, and push the unpushed e-mail data to the at least one mobile wireless communications device.

11. The aggregation server of claim 9, wherein the pushed e-mail data comprises pushed e-mail messages.

12. The aggregation server of claim 9, wherein the pushed e-mail data comprises pushed e-mail message search results.

13. The aggregation server of claim 9, wherein said processor is also configured to send an updated set of mobile wireless communications device defined metadata to said e-mail server.

14. A method of operating an aggregation server to communicate with an e-mail server configured to store pushed e-mail data and metadata associated therewith already pushed to respective mobile wireless communications devices, the method comprising:

downloading, using a processor, a first set of metadata of the pushed e-mail data from an e-mail server at a first time;

generating and storing, using the processor, a first set of hash values corresponding to the first set of metadata;

downloading, using the processor, a second set of metadata of the pushed e-mail data at a second time after the first time;

generating and storing, using the processor, a second set of hash values corresponding to the second set of metadata;

determining, using the processor, an updated set of metadata based upon a comparison of the first and second sets of hash values; and pushing, using the processor and a transceiver, the updated metadata to at least one mobile wireless communications device.

15. The method of claim 14, wherein the first and second sets of metadata respectively comprise first and second sets of e-mail server defined metadata.

16. The method of claim 15, wherein the e-mail server defined metadata comprises at least one of a message subject, a message sender, a message recipient, a message time/date stamp, whether a message was replied to, whether a message was read, and whether a message was forwarded.

17. The method of claim 14, wherein the first and second sets of metadata respectively comprise first and second sets of user defined metadata.

18. The method of claim 14, further comprising sending, using the processor and the transceiver, an updated set of mobile wireless communications device defined metadata to the e-mail server.

19. The method of claim 14, wherein the pushed e-mail data comprises pushed e-mail messages.

20. The method of claim 14, wherein the pushed e-mail data comprises pushed e-mail message search results.

* * * * *